United States Patent [19]

Ikeda et al.

[11] 4,235,504
[45] Nov. 25, 1980

[54] HOLOGRAPHIC DISK SCANNER

[75] Inventors: Hiroyuki Ikeda, Yokohama; Moritoshi Ando, Tokyo, both of Japan

[73] Assignee: Fujitsu Limited, Japan

[21] Appl. No.: 859,183

[22] Filed: Dec. 9, 1977

Related U.S. Application Data

[63] Continuation-in-part of Ser. No. 692,350, Jun. 3, 1976, Pat. No. 4,165,464.

[30] Foreign Application Priority Data

Jun. 10, 1975 [JP] Japan ................. 50-70378
Dec. 16, 1976 [JP] Japan ................. 51-151618
May 13, 1977 [JP] Japan ................. 52-55009
Oct. 5, 1977 [JP] Japan ................. 52-119636

[51] Int. Cl.³ ............................. G02B 5/32
[52] U.S. Cl. ....................... 350/3.71; 350/3.61
[58] Field of Search ............... 350/3.71, 6.1, 6.2

[56] References Cited

U.S. PATENT DOCUMENTS 3,940,202  2/1976  Kato et al. ................. 350/3.71

OTHER PUBLICATIONS

Bryngdahl et al., *Applied Optics*, vol. 15, No. 1, Jan. 1976, pp. 183-194.
McMahon et al., *Applied Optics*, vol. 8, No. 2, Feb. 1969, pp. 399-402.

*Primary Examiner*—Ronald J. Stern
*Attorney, Agent, or Firm*—Staas & Halsey

[57] ABSTRACT

A light scanning apparatus comprises a disk having a plurality of holograms, and a laser beam source for radiating and directing a laser beam (which functions as a reproduction wave) onto the holograms in a sequential order, wherein each of the holograms converges the laser beam toward a corresponding focal point. While the disk and the laser beam are moved relative to each other, the focal point scans an object to be scanned in a particular scanning direction. The laser beam acting as a reproduction wave is preferably a spherical wave laser beam. The holograms are constructed by a process in which both a spherical wave laser, acting as a reference wave, and a plane wave laser are applied to a photosensitive layer which is to be constructed as the hologram, in which process the plane wave laser beam is applied onto the photosensitive layer at a predetermined gradient forming an offset angle between the direction in which the plane wave laser is oriented and the direction in which the photosensitive layer extends.

17 Claims, 24 Drawing Figures

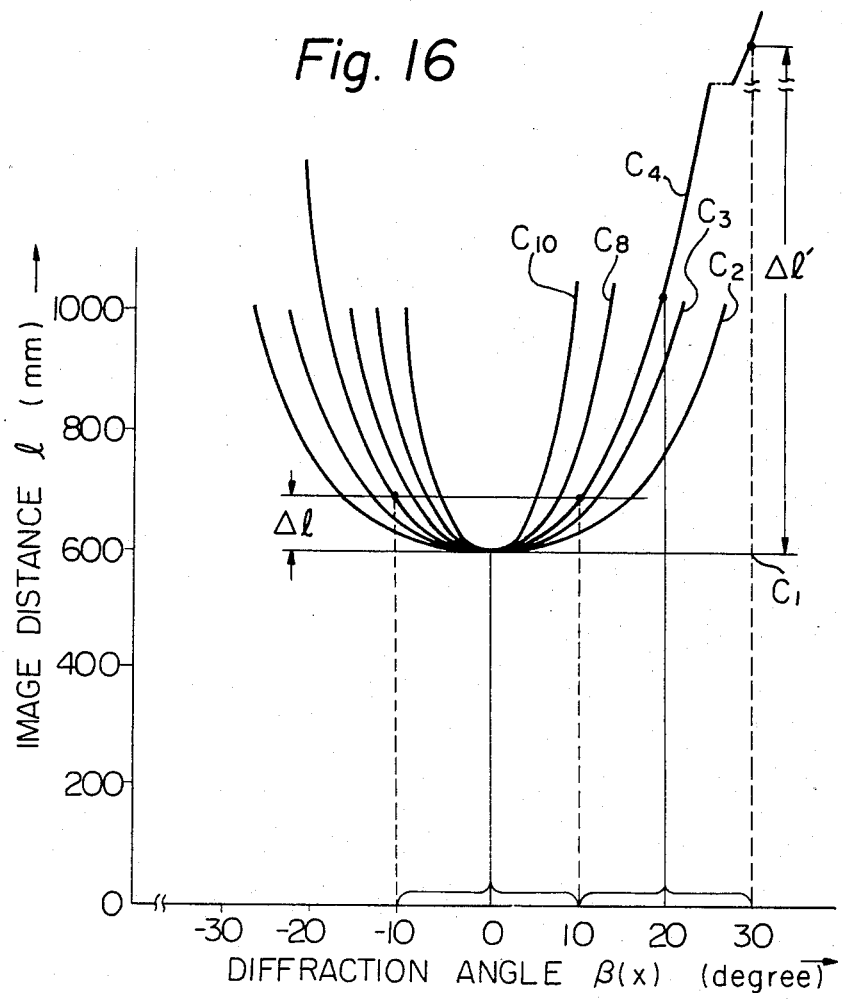

HOLOGRAPHIC DISK SCANNER

This application is a continuation-in-part application of the copending U.S. Pat. application Ser. No. 692,350 filed on June 3, 1976 now U.S. Pat. No. 4,165,464.

The present invention relates to a light scanning apparatus which scans an object by using a converged light beam radiated from a laser beam source and by passing the light beam through a hologram, and to a method for constructing such a hologram.

The light scanning apparatus according to the present invention can be applied to any systems. However, the following explanation refers to a light scanning apparatus which is applied to, for example, a point-of-sale system, that is, the so-called POS. In a commodity market, it is important to have an account of the goods in-stock, to be able to calculate the volume of sales, and to classify the goods which have been sold. If the goods to be traded are small in quantity and few in variety it is easy, then, to maintain an inventory of which goods are in stock, to calculate the volume of sales, and to classify the goods which have been sold. However, it is not so easy to carry out the above procedures when dealing with an enormous quantity and a large variety of goods. In recent years, the above-mentioned POS system has been proposed. By utilizing the POS system, a large quantity and variety of goods can be monitored by using the computer, and accordingly, calculation and classification of the sales and supply of goods can be performed automatically by virtue of the computer. In this POS system, since goods are monitored by the computer, information concerning each of the goods is marked directly on the goods in advance. Such information is marked on an outer surface of each of the goods by attaching a so-called bar-code label thereto. The bar-code is usually arranged by using UPC (Universal Product Code) symbols. The information on the bar-code, with regard to each of the goods, can be read and detected by the aid of a light scanning apparatus and a photo-sensor which is connected to an input of the computer. The light scanning apparatus provides a coherent light beam such as a laser beam which scans the bar-code, while the photo-sensor receives the coherent light beam reflected by the bar-code label. The intensity of the reflected coherent light beam subsequently changes in accordance with the bar-code. The computer reads the information in accordance with changes in the intensity of the reflected coherent light beam provided from the photo-sensor, which changes are in the form of a train of electric pulses.

One example of the light scanning apparatus has already been disclosed in FIG. 10 of our copending application, U.S. Pat. application Ser. No. 692,350 filed on June 3, 1976 now U.S. Pat. No. 4,165,464. This example will be described hereinafter. In the example, it is required to increase the length of scanning line to be scanned on the object without increasing the length of the hologram. It is already known that, in order to increase the length of the scanning line without increasing the length of the hologram, (1) a surface to be scanned must be positioned far from the focal plane, (2) a narrow laser beam, an opposed to the plane wave laser beam and the spherical wave laser beam, both used for creating the hologram, must be employed as the reproduction wave, (3) the narrow laser beam must be comprised of a spherical wave laser beam, and (4) the point source of the narrow laser beam must be located far from the hologram, contrary to the point source of the spherical wave laser beam for creating the hologram. Thus, the length of the scanning line can be easily increased without increasing the length of the hologram by utilizing a reproduction wave laser beam which satisfies the requirements stated in the above items (1), (2), (3) and (4).

However, the reproduction wave laser beam, according to the above requisites (1), (2), (3) and (4), can produce a defect whereby the focal plane, which is defined by imaging laser beams radiated when the reproduction wave laser beam illuminates and simultaneously moves the hologram in one direction, becomes a curved plane and not a flat plane. The curved plane exhibits the so-called curvature of the imaging field. It should be noted that the focal plane must be a flat plane in order to read the bar-code correctly. If the focal plane is formed so as to exhibit a curvature of the imaging field, the bar-code cannot be read correctly at all due to the fact that the size of the light spot produced by illuminating the imaging laser beam on the bar-code label becomes relatively large. It should be noted that the bar-code is comprised of many bars arranged in paralled to each other, and also that the width of each bar is very narrow, for example, 0.3 mm. Accordingly, when the size of the light spot is relatively large, each bar of the bar-code cannot be illuminated sequentially one by one because, two or more bars of the bar-code are illuminated by the imaging laser beam at the same time.

As mentioned above, although the imaging laser beam produced in accordance with the above items (1), (2), (3) and (4) is useful for increasing the length of the scanning line without increasing the length of the hologram, this imaging laser beam is not useful from the viewpoint of obtaining a high-quality POS system for reading a bar-code on the bar-code label.

Therefore, it is an object of the present invention to provide a light scanning apparatus which is useful for creating, for example, an effective POS system for reading the bar-code on a bar-code label. More specifically, it is an object of the present invention to provide a light scanning apparatus which utilizes holograms, constructed with a predetermined curvature of the imaging field with respect to both the predetermined central diffraction angle (explained hereinafter) and the predetermined deflection multiplying factor (explained hereinafter), and thus to increase the length of the scanning line.

The construction and operation of the apparatus of the present invention will become more apparent and better understood from the following detailed description in conjunction with the accompanying drawings, in which.

Figure 4:
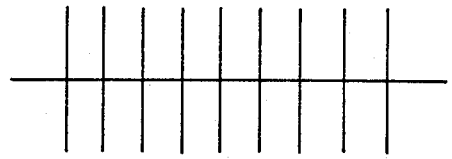
Figure 5A:
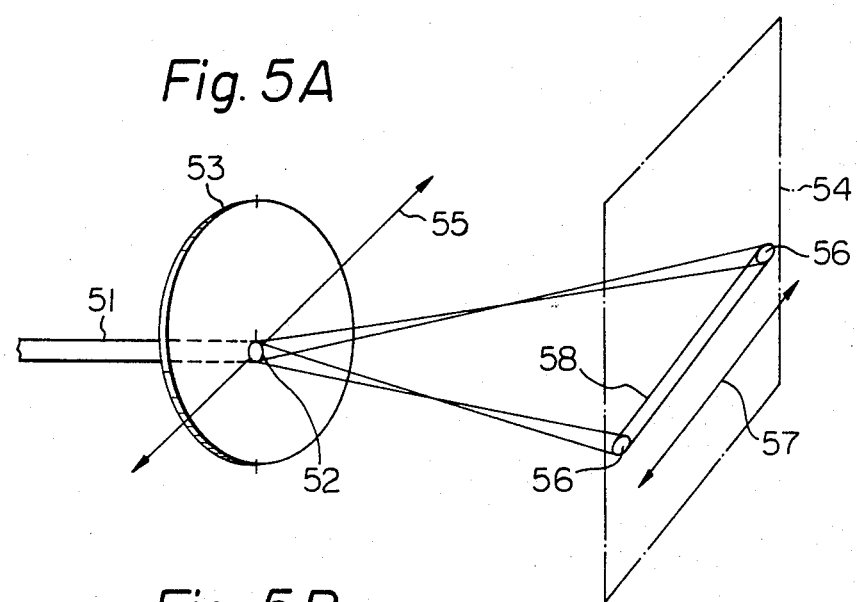
Figure 5B:
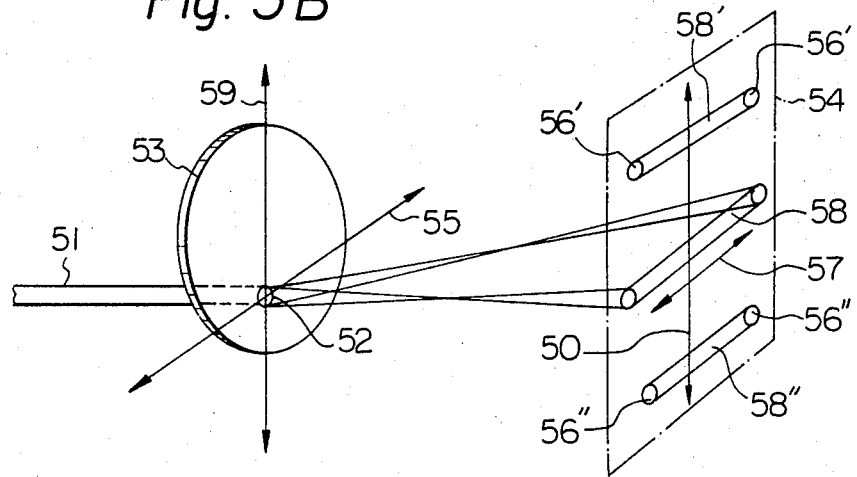
Figure 6:
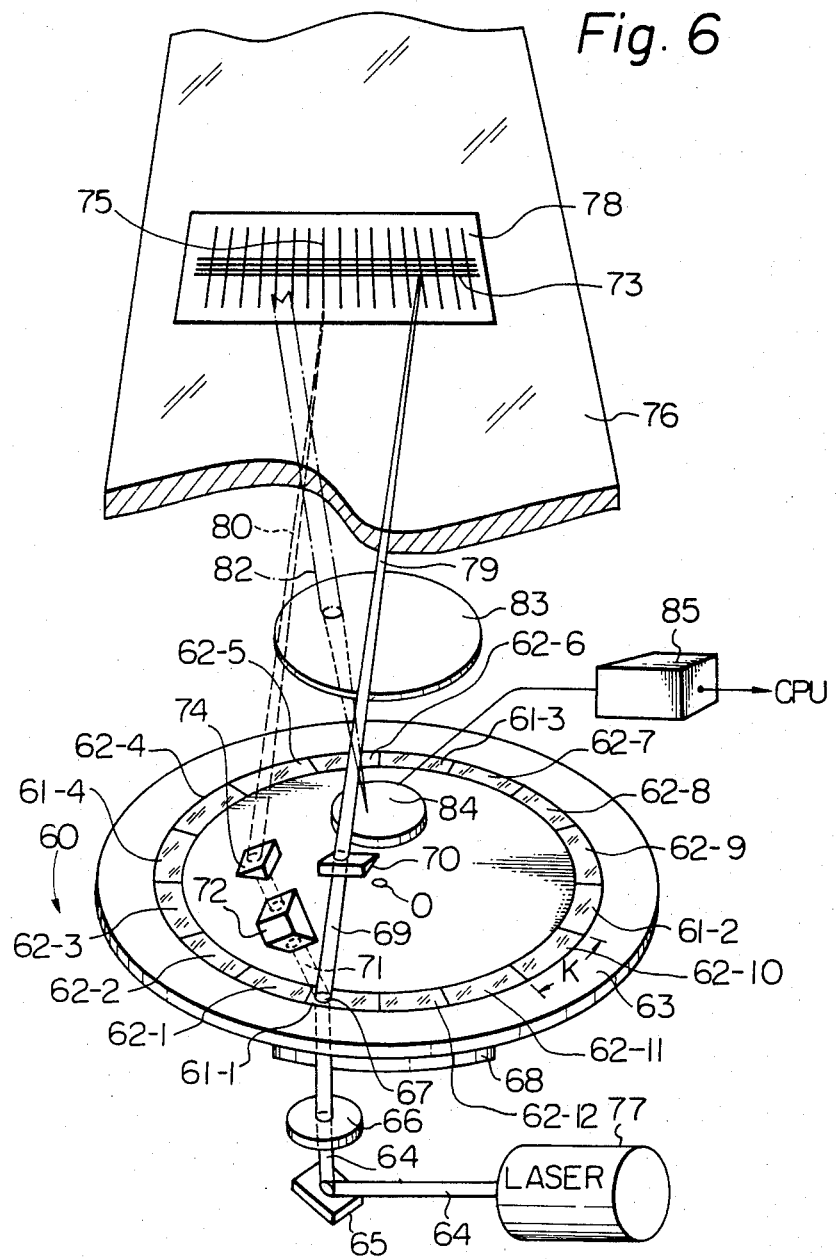

FIG. 4 schematically shows one example of a conventional two-dimensional scanning pattern exhibiting a right-crossing mode;

FIGS. 5A and 5B, respectively, are explanatory perspective views of a hologram and a laser beam which illuminates the hologram and radiates therefrom;

FIG. 6 is a pictorial view showing a light scanning apparatus. This Figure corresponds to FIG. 10 of the copending application, U.S. Pat. application Ser. No. 692,350 filed on June 3, 1976, now U.S. Pat. No. 4,165,464.

Figure 7A:
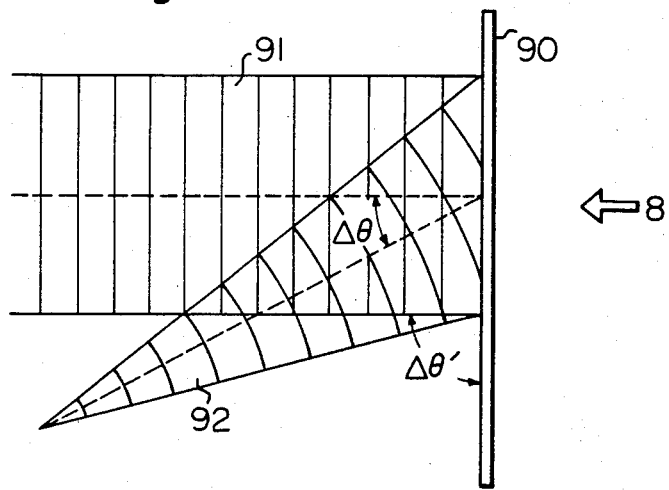
Figure 7B:
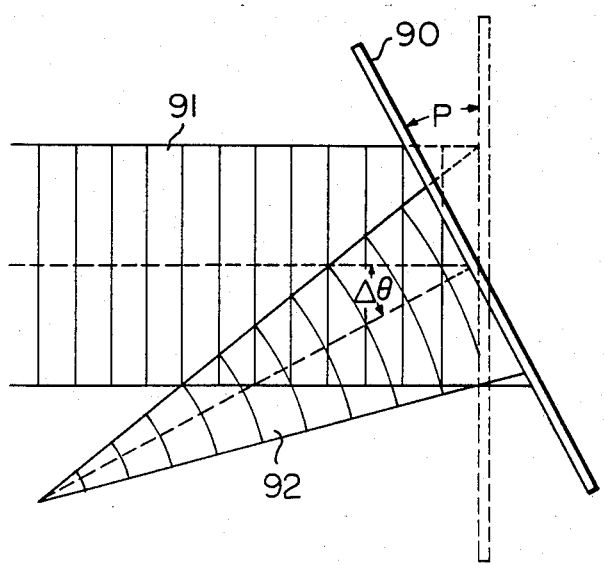
Figure 8:
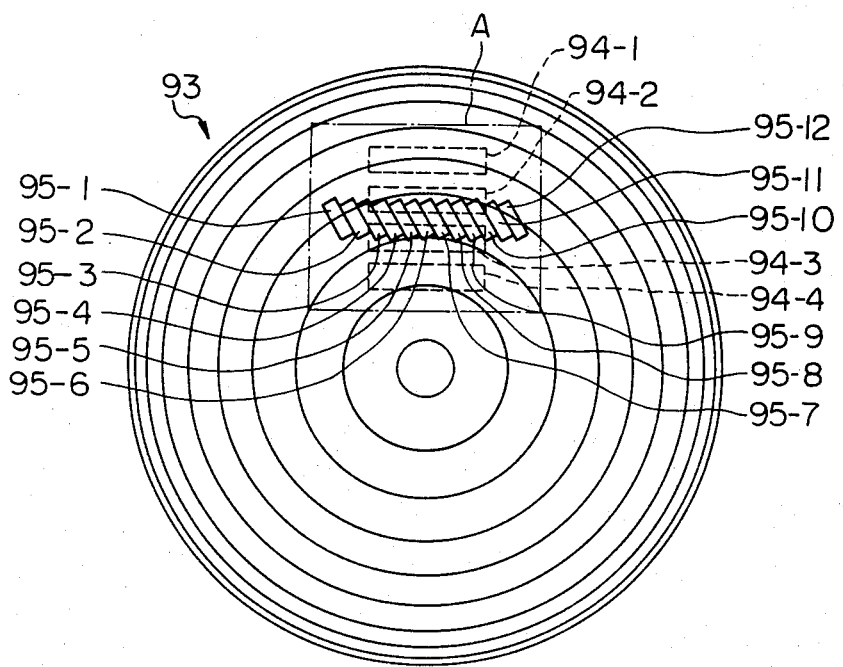
Figure 9:
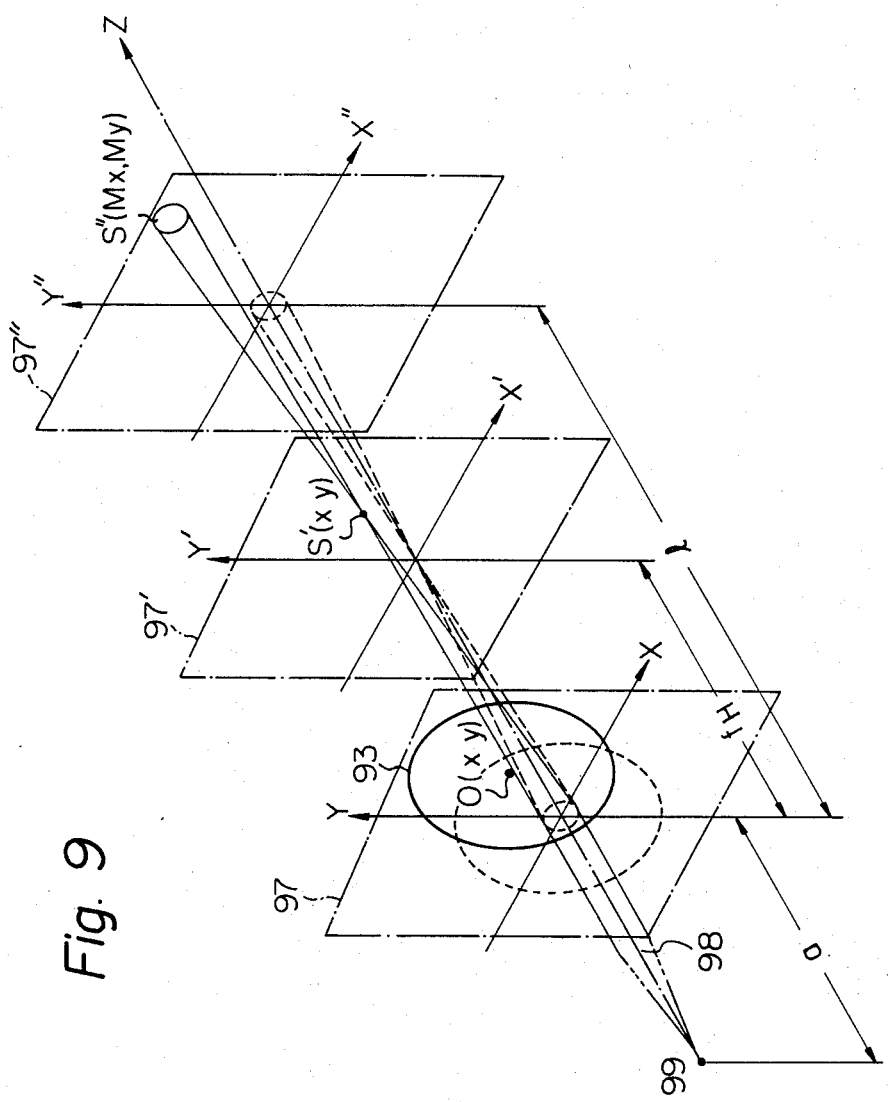
Figure 10:
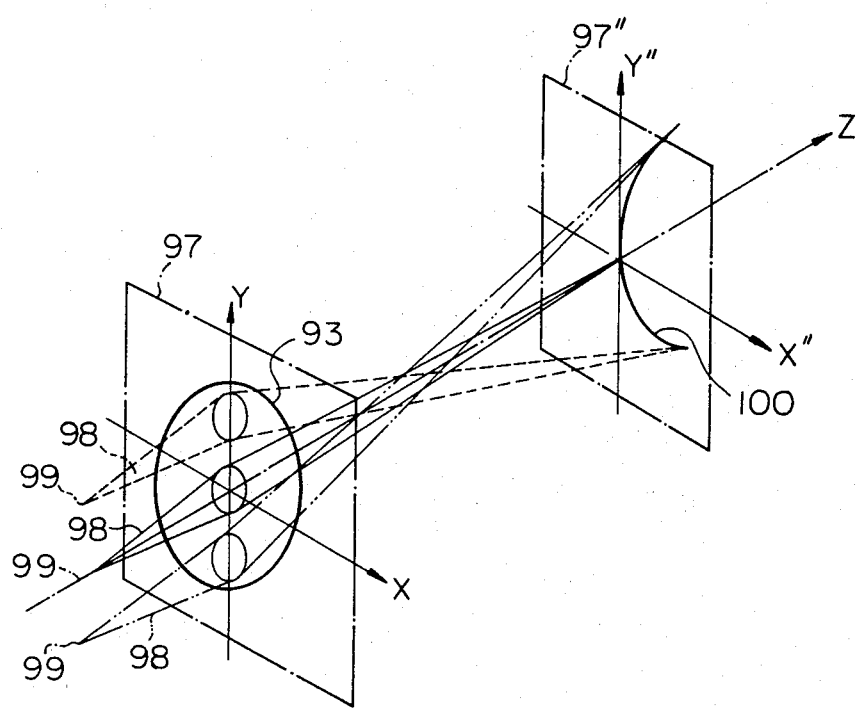

FIG. 7A is a plan view showing the conventional method for constructing a hologram;

FIG. 7B is a plan view showing a method for constructing a hologram used in a light scanning apparatus according to the present invention;

FIG. 8 is a plan view of a hologram made by the process corresponding to FIG. 7A;

FIG. 9 is an illustrative view showing an optical chart produced by a conventional hologram;

FIG. 10 illustrates how a curvature of the imaging field is produced;

FIGS. 11 through 14 are 8 respective views illustrating the occurence of the 8 curvature of the imaging field.

Figure 17:
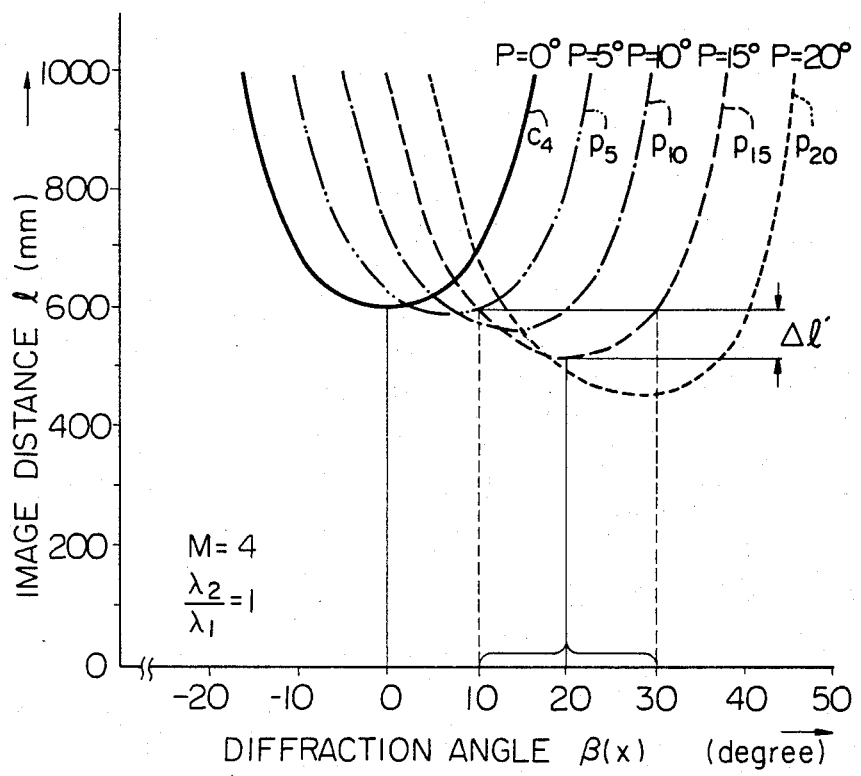
Figure 18:
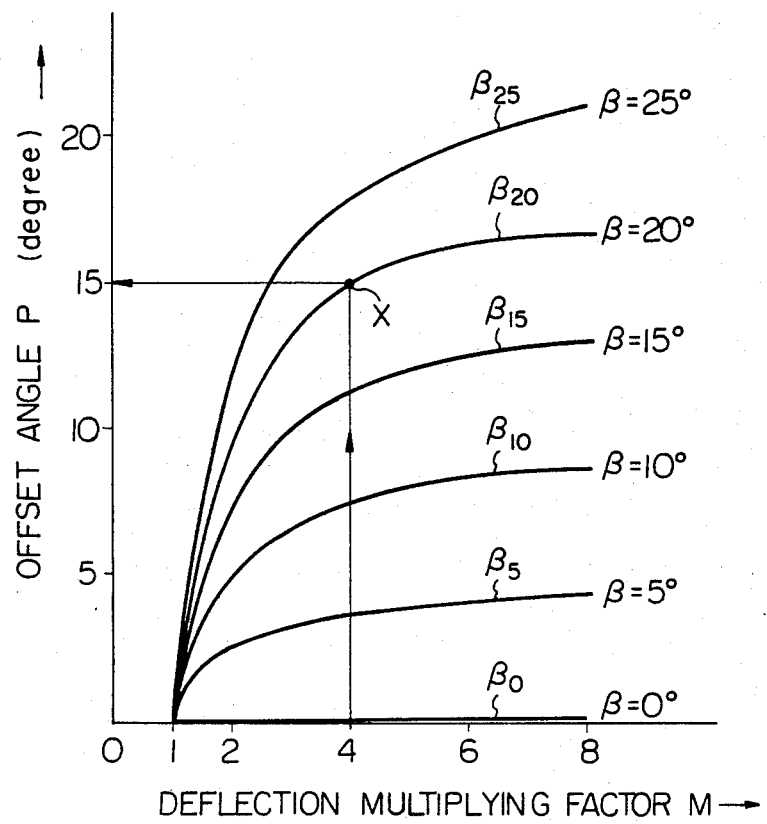
Figure 19:
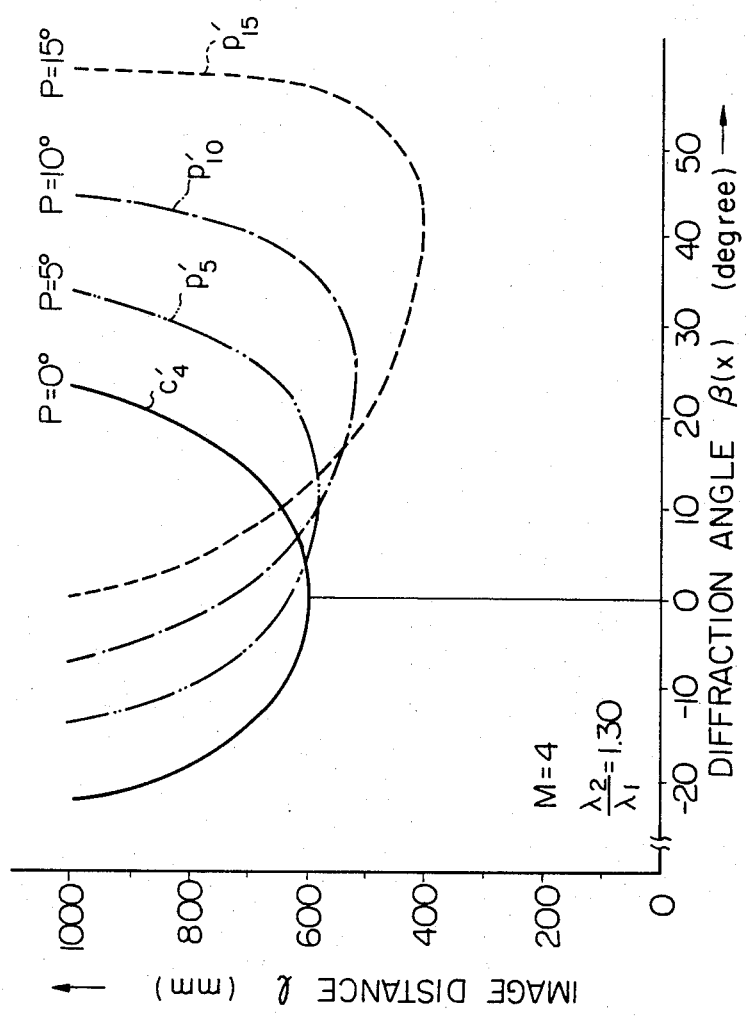
Figure 20:
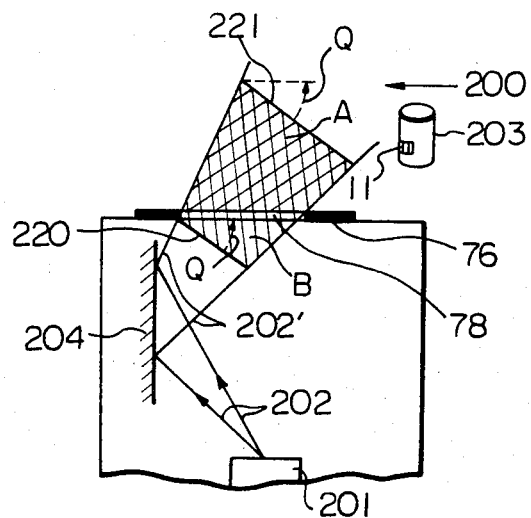
Figure 21:
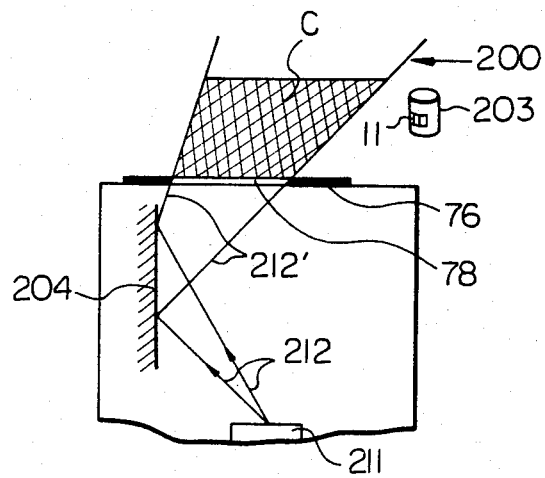
Figure 22:
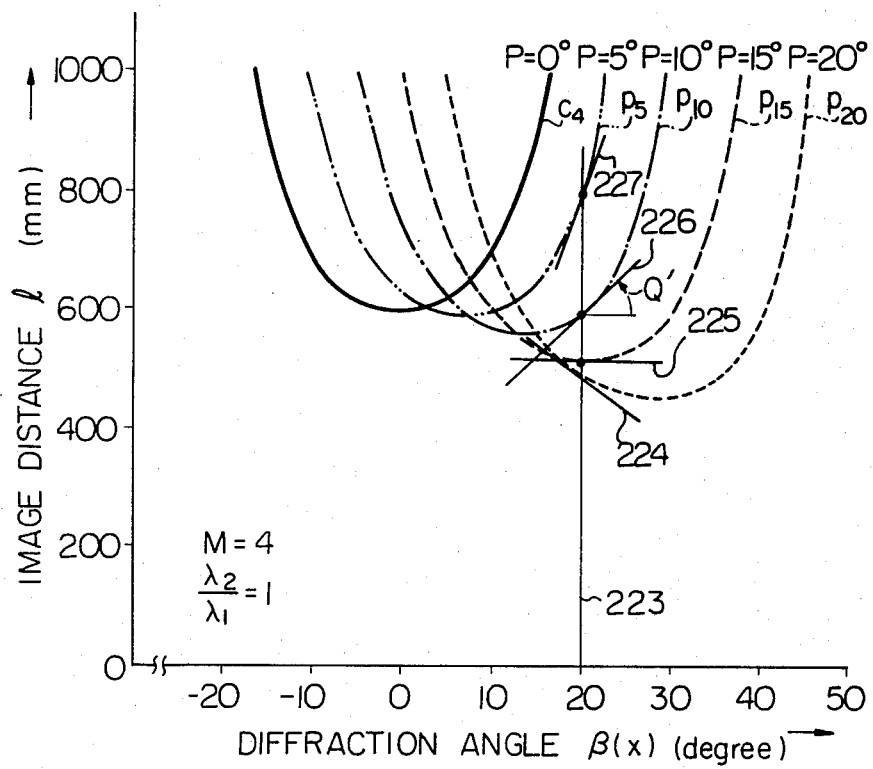

FIG. 15 is a table showing the different shapes of light spots in relation to varying diffraction angles;

FIG. 16 is a graph showing the profiles of the curvatures of the imaging fields;

FIG. 17 is a graph showing the profiles of the curvatures of the imaging fields with respect to each respective offset angle P, according to the present invention;

FIG. 18 is a graph of the curves utilized for determining the offset angle P from the deflection multiplying factor M and the central diffraction angle $\beta(x)$, according to the present invention;

FIG. 19 is a graph showing an improvement of the profiles of the curvatures of the imaging fields shown in FIG. 17 with respect to each respective offset angle P, according to the present invention;

FIG. 20 schematically illustrates a sectional and front view of the POS terminal device of the prior art;

FIG. 21 schematically illustrates a sectional and front view of the POS terminal device comprised of a light scanning apparatus according to the present invention and;

FIG. 22 is a graph utilized for explaining the steps of determining the offset angle P from the rotating angle Q shown in FIG. 20, according to the present invention.

Figure 1:
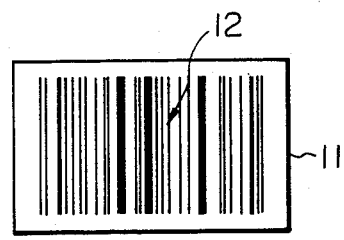
FIG. 1 is an enlarged plane view showing a conventional bar-code label.

FIG. 1 shows an enlarged plane view of a bar-code label which is attached to the outer surface of each of the goods to be scanned (not shown). In FIG. 1, numeral 11 represents a bar-code label. Numeral 12 is an example of a bar-code. The bar-code 12 is usually printed on the surface of the bar-code label 11. The bar-code 12 is arranged by using UPC symbols to represent data, such as maker, category and date of production of each of the goods (not shown) to which the bar-code label 11 is attached. The information with regard to each of the goods is read and processed by a computer (not shown), whereby the reading is automatically done by a combination of a light scanning apparatus and a photo-sensor, which are not shown in FIG. 1. The light scanning apparatus provides a coherent light beam (not shown), such as a laser beam, which scans the bar-code 12 transversely while the photo-sensor receives the coherent light beam reflected by the bar-code 12. The intensity of the reflected coherent light beam changes in accordance with the arrangement of the bar-code 12.

Figure 2:
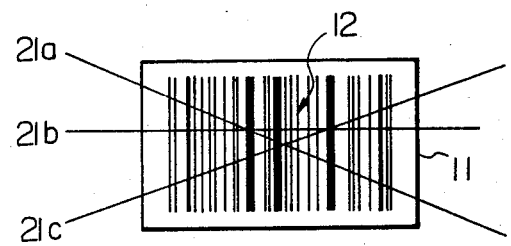
FIG. 2 is an enlarged plane view of a conventional bar-code label and scanning lines, in which any one of the scanning lines traverses the entire area of the bar-code.

The coherent light beam provided from the light scanning apparatus, scans the bar-code by traversing the entire bar-code, such as is shown in FIG. 2. In FIG. 2, lines 21a, 21b and 21c denote the scanning lines. Any one of the scanning lines 21a, 21b or 21c may be used to scan the bar-code 12 while traversing the entire bar-code.

Figure 3:
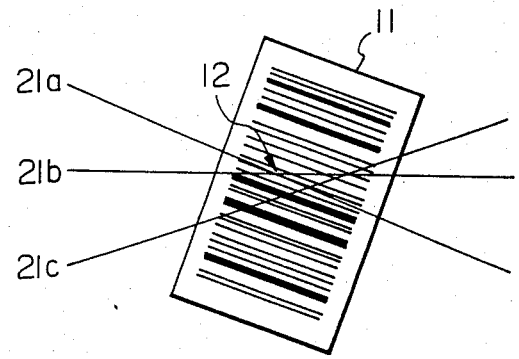
FIG. 3 is an enlarged plane view of a conventional bar-code label and scanning lines, in which none of the scanning lines traverses the entire area of the bar-code.

However, if the bar-code label is located at some particular angles with respect to the light scanning beam, the coherent light beam may not be able to scan the entire bar-code. That is, if the bar-code label is located at some particular angles such as those shown in FIG. 3, then none of the scanning lines 21a, 21b or 21c will be able to scan the bar-code 12 while traversing the entire bar-code. At this time, it is impossible for a computer to read information without producing any errors. Therefore, since each of the scanning lines 21a, 21b and 21c is one-dimensional, it is difficult for a computer to read information without producing any errors, especially when the bar-code label is revolving at some particular angles with respect to the scanning line.

Accordingly, to prevent the above error-producing problem, two-dimensional scanning is required. When two-dimensional scanning of the bar-code is utilized, such as is shown in FIG. 4, it is then assured that the computer will be able to read information without producing errors even though the bar-code label is being revolved at any angle. FIG. 4 shows a two-dimensional scanning pattern which exhibits a right-crossing mode.

The principle of the light-scanning method employed in a light-scanning apparatus according to the present invention is illustrated in FIGS. 5A and 5B. In FIG. 5A, a coherent light beam 51 (i.e., a laser beam) is projected onto a point 52 of a hologram 53. The laser beam 51 is then transmitted through the hologram 53 so that it reaches a scanned surface 54. When the hologram 53 is shifted in a direction along the arrow 55 perpendicular to the direction of the fixed laser beam 51, a light spot 56 traverses the scanned surface 54 in a direction along the arrow 57, thereby obtaining one scanning line 58. Since the hologram 53 has a diffraction grating provided with a gradient of the spatial frequency, and the frequency changes gradually toward a high frequency in accordance with the movement of the light spot 56 from the center of the hologram 53 to the periphery thereof, the hologram 53 acts as a conventional convex lens. Accordingly, the light spot 56 is formed by diffraction of the laser beam 51. In FIG. 5B, if the hologram 53 is shifted in a direction along the arrow 55 and in a direction along the arrow 59, alternately, light spots 56' and 56" can scan the image surface 54 in a horizontal direction parallel to the arrow 57, and thereby scanning lines 58' and 58" are alternately obtained. As a result, the entire scanning line 58 is also shifted on the scanned surface 54 in a vertical direction along the arrow 50.

FIG. 6, which is a pictorial view showing a light scanning apparatus, corresponds to FIG. 10 of the copending application, U.S. Pat. application Ser. No. 692,350 filed on June 3, 1976, now U.S. Pat. No. 4,165,464. In FIG. 6, both first holograms 61-1, 61-2 through 61-4 and second holograms 62-1, 62-2 through 62-12 are secured into a circular disk 63. These holograms are arranged along one circular locus defined by a central point O. A laser beam 64 is reflected toward the circular disk 63 by a mirror 65. The laser beam 64 radiated by a laser source 77 is then transmitted through a convex lens 66 to fixedly illuminate a point 67 on the circular disk 63. When the circular disk 63 is rotated in a direction along arrow 60 by an electric motor 68, each of the holograms 61-1, 61-2 ... provides a scanning laser beam 69 which illuminates a prism 70, while each of the holograms 62-1, 62-2 . . . provides a scanning laser beam 71 which illuminates a Dove prism 72. This is because, each of the holograms 61-1, 61-2 . . . is previously designed so that the scanning laser beam which is transmitted therethrough may be directed to the prism 70 by diffraction, and also each of the holograms 62-1, 62-2 . . . is previously designed so that the scanning laser beam which is transmitted therethrough may also be directed to the Dove prism 72 by diffraction. The scanning laser beam 69 which is transmitted through the prism 70, forms one of the corresponding scanning lines 73 which extend from left to right to FIG. 6. The scanning beam 71 which is transmitted through both the Dove prism 72 and a prism 74, forms one of the corresponding scanning lines 75 which extend from top to bottom on the image surface in FIG. 6. It should be recognized that the direction of the deflection of the scanning laser beam 71 can easily be adjusted by the Dove prism 72 at any angle of from 0° through 360°.

In FIG. 6, numeral 76 represents a part of a POS terminal device. The device 76 has a transparent window 78 for scanning the bar-code label shown as 11 in FIG. 1. When each of goods (not shown in FIG. 6) is located above the window 78 and when the bar-code label which is attached to the outer surface of each of the goods faces towards the window 78, the scanning laser beams 79 and 80 scan the bar-code (shown as 12 in FIG. 1) with a scanning pattern having a right-crossing mode.

Each of the scanning laser beams 79 and 80 is reflected by the bar-code label, and the reflected scanning laser beam 82 is collected by a condenser lens 83, if necessary, for illuminating a photo-sensor 84 comprised of a photomultiplier tube. The intensity of the reflected scanning laser beam 82 changes in accordance with the bar-code, and the changes of the intensity are converted to a train of electric pulses by the photo-sensor 84. This train of electric pulses from the photo-sensor 84 is demodulated by a demodulator 85. The output signals are then transmitted to a central processing unit (CPU) (not shown in FIG. 6).

FIG. 7A is a plan view showing the conventional method for constructing a hologram. In FIG. 7A, numeral 90 denotes a transparent glass plate with a photosensitive layer coated thereon. A hologram to be produced is formed in the photosensitive layer. A laser source (not shown) provides a laser beam, and the laser beam is separated into two laser beams 91 and 92 by means of a half mirror (not shown). The first laser beam 91 a plane wave, i.e., the so-called reference wave. The second laser beam 92 is a spherical wave. Then, interference fringes are produced on the photosensitive layer of the plate 90. Accordingly, the interference fringes form a hologram or the so-called diffraction gratings. The symbol $\Delta\theta$, indicates a predetermined deflection angle between the plane wave 91 and the spherical wave 92. The symbol $\Delta\theta'$ indicates an angle of intersection between the plate 90 and the plane wave 91, and it should be noted that the angle of intersection $\Delta\theta'$ is a right angle (90°).

FIG. 8 is a plan view of a hologram made by the process corresponding to FIG. 7A. In FIG. 8, an area A corresponds to a plan view of hologram seen from the direction of the arrow 8 in FIG. 7A. In FIG. 8, a hologram 93 has diffraction gratings therein which form a plurality of concentric circles. However, only ten concentric circles are shown in FIG. 8. This hologram 93 is identified as a fresnel zone plate. Each hologram 93 is divided into a plurality of hologram pieces 94-1 through 94-4 which are distributed on the circular disk 63 (FIG. 6) as holograms 61-1 through 61-4 (FIG. 6), respectively. Each hologram 93 is also divided into a plurality of hologram pieces 95-1 through 95-12 which are distributed on the circular disk 63 (FIG. 6) as holograms 62-1 through 62-9 (FIG. 6), respectively.

Returning to FIG. 6, the total length of both of the scanning lines 73 and 75 is generally considerably long, for example about 3 m. Accordingly, the total length of each of the holograms 61-1 through 61-4 and 62-1 through 62-9 corresponds to about 3 m. Therefore, the diameter of the circular disk 63 will be almost the same as or equivalent to 1 m ($3/\pi$ m). As a result of these measurements, the POS terminal device, a part of which is referenced by numeral 76, becomes very large in size.

Next, the conventional method for decreasing the total length of each of the holograms 61-1 through 61-4 and 62-1 through 62-12 (FIG. 6), without decreasing the total length of the scanning lines 73 and 75, is shown in FIG. 9. FIG. 9 is an illustrative view showing an optical chart produced by a conventional hologram.

In FIG. 9, the hologram 93 moves on and along a flat plane 97 defined by the coordinates X—Y in FIG. 9. Along and on a focal plane 97' defined by the coordinates X'-Y', a focal point S' moves in accordance the movement of the hologram 93. This focal point is obtained by imaging a laser beam 98 through the hologram 93. Along and on an image plane 97" defined by the coordinates X"—Y", a light spot S" moves in accordance with the movement of the hologram 93. Each intersection point of the coordinates X—Y, X'—Y' and X"—Y" is positioned on the Z-axis.

In FIG. 9, the movement of the focal point S' on the focal plane 97' is proportional to the movement of the center 0 of the hologram 93 on the flat plane 97. Accordingly, the coordinates (x, y) for defining the center 0 are the same as the coordinates (x', y') for defining the focal point S'. In this case, the coordinates of the light spot S" are defined as (Mx, My), wherein the number M is greater than 1 (M>1) because the image plane 97" is located far from the focal plane 97' with respect to the flat plane 97. M is known as the deflection multiplying factor and is derived from the following equation (1):

$$M = l/f_H \quad (1)$$

where l is a distance between the planes 97 and 97", and $f_H$ is a distance between the planes 97 and 97'. Thus, the amount of deviation of the scanning light spot S" is increased to M times the amount of deviation of the moving center 0. Accordingly, in FIG. 6, the length of each hologram may be decreased without decreasing the length of the corresponding scanning line. However, in FIG. 9, since the laser beam 98 is a plane wave according to conventional prior art practice, the imaging light spot S" on the image plane 97" can increase in size. Therefore, a high resolving power for reading a bar-code cannot be obtained. In this respect, it is necessary to increase the imaging distance in order to form a focal point on the image plane 97". An increase of the imaging distance may be achieved by using the laser beam 98 which is a spherical wave and not a plane wave. Thus, a focal point can be provided on the image plane 97". In this case, the following equation (2) is obtained.

$$(1/a) + (1/l) = 1/f_H \qquad (2)$$

where a is the distance between a spherical wave source 99 and the plane 97. Thereby, a focal point of the laser beam 98 which is a spherical wave can be provided on the image plane 97''. A disadvantage is brought about by the condition wherein the focal points form a curvature of the imaging field. The curvature of the imaging field is shown in FIG. 10. FIG. 10 illustrates how the curvature of the imaging field is produced. Accordingly, when the hologram 93 and the spherical wave source 99 move relative to each other, the focal points will form the curvature of the imaging field 100. The reason that the imaging field becomes not flat but curved is in the fact that the reproduction plane wave 98 (FIG. 9) is not identical to the laser beams 91 and 92 (FIG. 7A). Generally, a laser beam functioning as a reproduction wave should either be a plane wave laser beam or a laser beam functioning as a reference wave. The plane wave laser beam and the reference wave laser beam are both used for constructing holograms.

Figure 11:
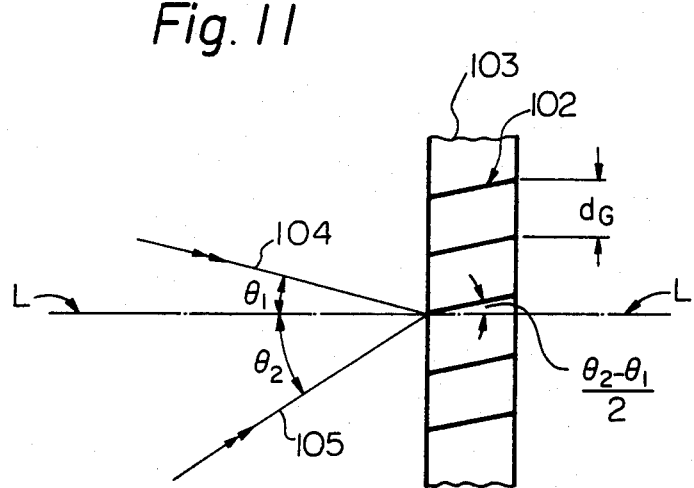

The occurrence of the curvature of the imaging field will be explained in more detail hereinafter. FIG. 11 is the first of four illustrations which describe the occurrence of the curvature of the imaging field. In FIG. 11, interference fringes 102 are formed in a recording medium 103 comprised of a photosensitive layer (refer to description of the photosensitive layer with regard to FIG. 7A) by illuminating two different coherent waves 104 and 105 onto the recording medium 103. The coherent waves 104 and 105 are directed to the photosensitive layer 103 at angle of incidence angles $\theta_1$ and $\theta_2$, respectively, with respect to a normal L of the recording medium 103. The interference fringes 102 are formed parallel to each other at an angle $(\theta_2 - \theta_1)/2$ (see FIG. 11). The diffraction grating pitch thereof (see $d_G$ in FIG. 11) is derived from the following equation (3), in which the thickness of the recording medium 103 is not taken into consideration because the thickness is very small:

$$d_G = \frac{\lambda}{2\sin\frac{\theta_2 + \theta_1}{2}\cos\frac{\theta_2 - \theta_1}{2}} = \frac{\lambda}{\sin\theta_1 + \sin\theta_2} \qquad (3)$$

where, $\lambda$ is a wave length of both coherent waves 104 and 105.

Figure 12:
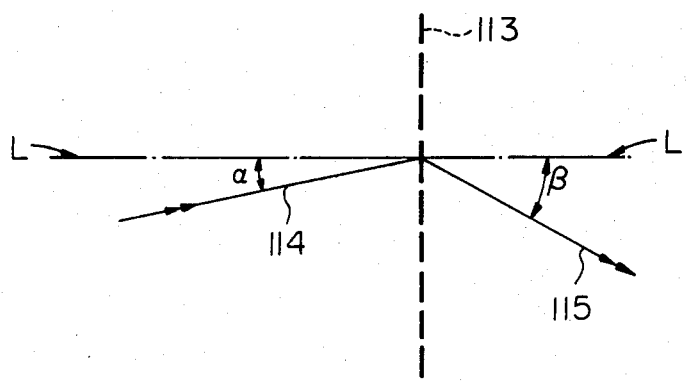

FIG. 12 is a second illustration which describes the occurrence of the curvature of the imaging field. In FIG. 12, the refernece numeral 113 schematically indicates a hologram produced in the recording medium 103 (FIG. 11). The symbol $\alpha$ represents the angle of incidence of a coherent reproduction wave 114, and the symbol $\beta$ represents the diffraction angle of an imaging wave 115. The relation between the angles $\alpha$ and $\beta$ is defined by the following equation (4):

$$\beta = \sin^{-1}\left(\frac{\lambda}{d_G} - \sin\alpha\right) \qquad (4)$$

In the above equation (4), when the angles $\alpha$ and $\beta$ are located on the same plane, that is, above the normal L (FIG. 11) or below the normal L (FIG. 11), these angles $\alpha$ and $\beta$ will have the same positive or negative signs, respectively. From the above equations (3) and (4), the following equation (5) is derived:

$$\beta = \sin^{-1}(\sin\theta_1 + \sin\theta_2 - \sin\alpha) \qquad (5)$$

From the above equation (5), the diffraction angle $\beta$ is determined, after the angles $\theta_1$ and $\theta_2$ (FIG. 11) and the angle $\alpha$ (FIG. 12) have all been determined.

Figure 13:
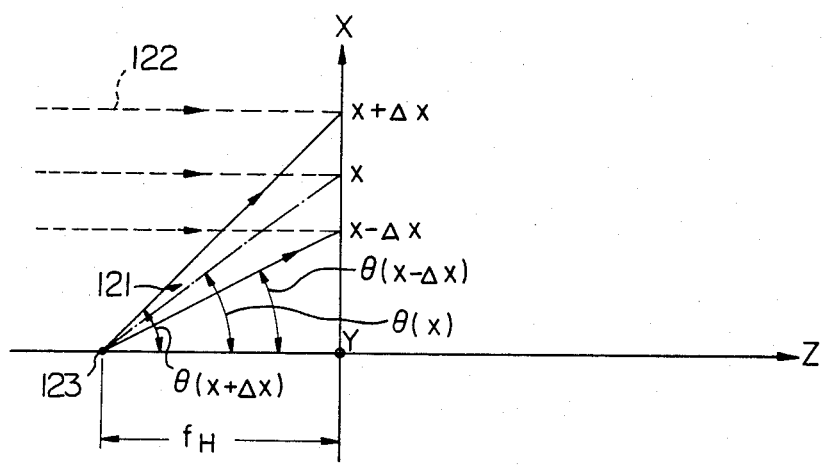

In FIG. 13, which is the third view describing the curvature of the imaging field, when a spherical wave 121 and a plane wave 122 are illuminated on a recording medium (not shown in FIG. 13 but please refer to the member 103 in FIG. 11) located on a plane defined by the coordinates X—Y, an interference between the waves 121 and 122 occurs on the X—Y coordinates and a diffraction grating is obtained. The diffraction grating pitches $d_G(x + \Delta x)$, $d_G(x)$ and $d_G(x - \Delta x)$ occurring at points $x + \Delta x$, x and $x - \Delta x$ on the ordinate x, respectively, are defined by the following equations (6):

$$d_G(x + \Delta x) = \frac{\lambda}{\sin\theta(x + \Delta x)} \qquad (6)$$

$$d_G(x) = \frac{\lambda}{\sin\theta(x)}$$

$$d_g(x - \Delta x) = \frac{\lambda}{\sin\theta(x - \Delta x)}$$

where $\theta(x + \Delta x)$, $\theta(x)$ and $\theta(x - \Delta x)$ are angles of incidence of the spherical wave (121) from a spherical wave source 123 directed onto the points $x + \Delta x$, x and $x - \Delta x$, in FIG. 13, respectively. The angles of incidence $\theta(x + \Delta x)$, $\theta(x)$ and $\theta(x - \Delta x)$ are defined, in FIG. 13, by the following equations (7):

$$\theta(x + \Delta x) = \tan^{-1}\frac{x + \Delta x}{f_H} \qquad (7)$$

$$\theta(x) = \tan^{-1}\frac{x}{f_H}$$

$$\theta(x - \Delta x) = \tan^{-1}\frac{x - \Delta x}{f_H}$$

where $f_H$ is the distance between the spherical wave source 123 and the plane defined by the coordinates X—Y.

Figure 14:
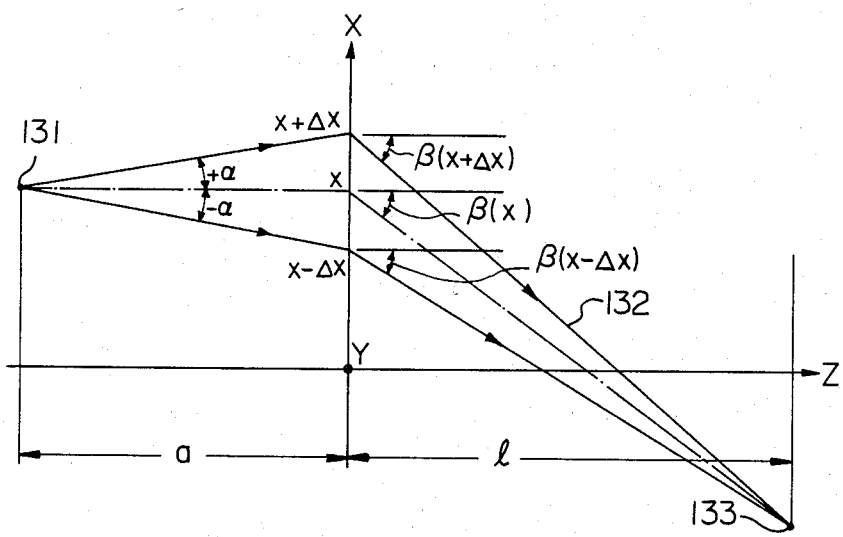

In the fourth illustration, FIG. 14, a hologram having diffraction gratings is located between $x + \Delta x$ and $x - \Delta x$ on a plane defined by the coordinates X—Y. When a spherical wave source 131 is located at a position (x, a) as shown in FIG. 14, reproduction angles at the points $x + \Delta x$, and $x - \Delta x$ become $+\alpha$, 0 and $-\alpha$, respectively. Furthermore, diffraction angles of an imaging wave 132 at the points $x + \Delta x$, x and $x - \Delta x$ become $\beta(x + \Delta x)$, $\beta(x)$ and $\beta(x - \Delta x)$, respectively. The $\beta(x)$ is called a central diffraction angle. The diffraction angles $\beta(x + \Delta x)$, $\beta(x)$ and $\beta(x - \Delta x)$ are derived from the above equations (4), (6) and (7) and are defined by the following equations (8):

$$\beta(x + \Delta x) = \sin^{-1}[\sin(\tan^{-1}(\frac{x + \Delta x}{f_H})) - \sin\alpha] \qquad (8)$$

$$\beta(x) = \sin^{-1}[\sin(\tan^{-1}(\frac{x}{f_H}))]$$

$$\beta(x - \Delta x) = \sin^{-1}[\sin(\tan^{-1}(\frac{x - \Delta x}{f_H})) + \sin\alpha]$$

The imaging wave 132 converges at a point 133. The symbol l represents the distance between the plane defined by the coordinates X—Y and a plane which is parallel thereto, in which latter plane the point 133 exists. The distance l is called the imaging distance. The value of the imaging distance l can be derived by referring to the methods described with reference to FIGS.

13 and 14 and to the above equation (8), and is defined by the following equation (9):

$$l = \frac{2a \tan \alpha}{\tan \beta(x + \Delta x) - \tan \beta(x - \Delta x)} \quad (9)$$

where a is the distance between the spherical wave source 131 and the plane defined by the coordinates X—Y, and Δx may be defined as:

$$\Delta x = a \tan \alpha$$

In the above equation (9), when the value of Δx is a fixed value and the value of x is gradually increased, in other words, when the central diffraction angle β(x) is gradually increased, the imaging distance l is extended greatly in accordance with the increase of the value of β(x). Due to the extension of the imaging distance l according to the increase of the value of β(x), the curvature of the imaging field 100 (FIG. 10) is produced. It is noted that the curvature of the imaging field cannot be created when the deflection multiplying factor M (See FIG. 9) equals 1 (M=1).

As is apparent from the above description regarding the curvature of the imaging field, as β(x) increases further the imaging distance l becomes longer. The central diffraction angle may also be defined as an angle between the direction of the imaging wave and the direction of a zero dimensional wave. The zero dimensional wave is a wave which passes straight through a hologram.

Returning to FIG. 6, the central diffraction angle, that is the aforesaid β(x), of the scanning laser beam 71 is quite large when compared to that of the scanning laser beam 69. Accordingly, it is inevitable for the scanning lines 75 scanned by the scanning laser beam 71 radiated by being passed through the holograms 62-1 through 62-12 to form a deflective curvature of the imaging field. Therefore, a light spot focused on the bar-code label increases in size, such as that shown in column I at FIG. 15. Column I shows light spots (write areas) images onto the bar-code label at diffraction angles of 16°, 20°, 24°, 28° and 32° of the scanning laser beam 75 with respect to the zero dimensional wave of each of the holograms 62-1 through 62-12, according to the prior art light-scanning apparatus. It is easily understood that the light spots shown in column I do not have a high resolving power for reading the bar-code. Accordingly, the bar-code cannot be read without errors being produced.

FIG. 16 is a graph showing different profiles of the curvatures of the imaging fields. In this graph, the ordinate indicates the imaging distance l in millimeters and the abscissa indicates the diffraction angle β(x) in degrees. The curves $C_1$, $C_2$, $C_3$, $C_4$, $C_8$ and $C_{10}$ are profiles of the curvatures of imaging fields when the deflection multiplying factors M are 1, 2, 3, 4, 8 and 10, respectively. When the factor M equals 1, no curvature of the imaging field is created. However, the total length of all the scanning lines 73 (FIG. 6) is the same as the total length K (FIG. 6) of the holograms 61-1 through 61-4 (FIG. 6). Also, the total length of all the scanning lines 75 is the same as the total length K (FIG. 6) of the holograms 62-1 through 62-12 (FIG. 6). Accordingly, if the total length of the scanning lines 73 and 75 is 3 m, the diameter of the disk 63 (FIG. 6) would increase greatly to about 1 m. In order to decrease the diameter of the disk 63 (FIG. 6) to, for example, one fourth of the diameter, the deflection multiplying factor M must be selected to be 4 (M=4). When M equals 4, the curve $C_4$ in FIG. 16 is obtained. In the case of the curve $C_4$, when the diffraction angle β(x) is within a range of 0°±10°, the variation of the value l of the imaging distance l is not so large. Thus, the resolving power of each of the scanning beam, that is the scanning lines 75 (FIG. 6), is relatively high. Each of the scanning lines 73 is scanned by the scanning laser beam 69 (FIG. 6) radiated from the corresponding holograms with the diffraction angles β(x) being within a range of 0°±10°. Contrary to this, when the diffraction angle β(x) is within a range of 20°±10°, the variation of the value l' of the imaging distance l is extremely large. Thus, the resolving power of each of the scanning lines 75 (FIG. 6) is considerably low. Each of the scanning lines 75 is scanned by the scanning laser beam 71 (FIG. 6) radiated from the corresponding holograms with the diffraction angles β(x) being within a range of 20°±10°.

The holograms used in the light scanning apparatus according to the present invention will be described hereinafter. The hologram based on the present invention is constructed by applying both a plane wave and a spherical wave onto the photosensitive layer. The plane wave is applied onto the photosensitive layer with a predetermined offset angle P° therebetween, which offset angle is not equal to 0°. FIG. 7B is a plan view which illustrates a method for producing a hologram employed in a light scanning apparatus according to the present invention. In FIG. 7B, the numerals 90, 91 and 92 indicate the same members as those shown in FIG. 7A. The difference between the view of FIG. 7A and the view of FIG. 7B is that the transparent glass plate 90 intersects the plane wave laser beam 91 not at a right angle (see Δθ' (=90°) in FIG. 7A) but at a predetermined offset angle P. A hologram which is produced in the photoresistive layer (not shown) coated on the plate 90 in FIG. 7B is very useful for producing uniform imaging distances with respect to any of the given central diffraction angles β(x).

The effectiveness of the hologram produced by the process shown in FIG. 7B will be clarified by referring to FIG. 17. FIG. 17 is a graph showing the different profiles of the curvatures of the imaging fields. In this graph, the ordinate indicates the imaging distance l in millimeters and the abscissa indicates the diffraction angle β(x) in degrees. It should be noted that, although this graph pertains only to the curve $C_4$ in FIG. 16, graphs similar to this graph in FIG. 17 can be obtained for curves $C_2$, $C_3$, $C_8$ and $C_{10}$ in FIG. 16. In the graph of FIG. 17, the curves $C_4$, $P_5$, $P_{10}$, $P_{15}$ and $P_{20}$ are obtained by using holograms produced by the process shown in FIG. 7B with the offset angles P being equal to 0°, 5°, 15° and 20°, respectively. The hologram produced with an offset angle P of 0° is a conventional hologram. Accordingly, the curve $C_4$ drawn by the solid curve in FIG. 17 is a conventional curve which is exactly the same as the curve $C_4$ shown in FIG. 16. In FIG. 17, when the diffraction angle β(x) changes within a range of 10°<β(x)<30°, that is, 20°±10°, the least variation Δl' of the imaging distance l is obtained by the curve $P_{15}$. The diffraction angles β(x+Δx), β(x) and β(x−Δx) are defined by the following equations (8)', which is a modification of the above equations (8):

$$\beta(x + \Delta x) = \sin^{-1}[\sin P + \sin(\tan^{-1}(\frac{x + \Delta x}{f_H})) - \sin\alpha] \quad (8)'$$

-continued $$\beta(x) = \sin^{-1}[\sin P + \sin(\tan^{-1}(\frac{x}{f_H}))]$$

$$\beta(x - \Delta x) = \sin^{-1}[\sin P + \sin(\tan^{-1}(\frac{x - \Delta x}{f_H})) + \sin\alpha]$$

The imaging distance l can be obtained by substituting the expressions $\beta(x+\Delta x)$ and $\beta(x-\Delta x)$ in equations (8)' for the expressions $\beta(x+\Delta x)$ and $\beta(x-\Delta x)$ in the above equation (9). Accordingly, it is easily recognized from this graph that the most appropriate offset angle P is 15° when the deflection multiplying factor M is set to be 4 and the central diffraction angle $\beta(x)$ is set to be 20°. As previously mentioned, the variation $\Delta l'$ (refer to $\Delta l'$ in FIG. 16) of the imaging distance l is extremely large, and according defective light spots such as those shown in column I of FIG. 15 are illuminated on the bar-code label. Contrary to this, in the present invention, the variation $\Delta l'$ (refer to $\Delta l'$ in FIG. 17) of the imaging distance l is very small. Therefore, since the defective light spots are prevented from occurring, and small light spots such as those shown in column II of FIG. 15 are illuminated on the bar-code label, a considerably high resolving power of the scanning beam for reading the bar-code can be obtained.

In practice, both the deflection multiplying factor M and the central diffraction angle $\beta(x)$ of each hologram are determined at the beginning of the design process for manufacturing the POS terminal device (FIG. 6). Accordingly, both the factor M and angle $\beta(x)$ are determined first and the angle P may be determined thereafter. Consequently, it is convenient to prepare a reference curve for determining the angle P from the determined M and $\beta(x)$. One example of the above-mentioned reference curve is shown in FIG. 18. In the graph of FIG. 18, the ordinate indicates the optimum offset angle P in degrees and the abscissa indicates the deflection amplifying factor M. The curves $\beta_{25}$, $\beta_{20}$, $\beta_{15}$, $\beta_{10}$, $\beta_5$ and $\beta_0$ are plotted, respectively, at the central diffraction angles $\beta(x)$ of 25°, 20°, 15°, 10°, 5° and 0°. By using the above reference curve, the optimum offset angle P can be instantly determined for any desired factor M and at any desired angle $\beta(x)$. For example, the factor M is determined to be 4 and the angle $\beta(x)$ is determined to be 20°, the optimum angle P may be decided from a point X on the curve $\beta_{20}$. The point X provides the optimum offset angle P, that is 15°. The offset angle 15° provides, when M=4 and $\beta(x)=20°$, the least variation $\Delta l'$ of the imaging distance l within a range 20°±10° (refer to $\Delta l'$ relating to the curve $P_{15}$ in FIG. 17).

The reason why the offset angle P is effective for reducing the magnitude of the variation $\Delta l$ of the imaging distance l at any diffraction angle $\beta(x)$, is not completely clear, but such condition may be due to the following reasoning. Generally, the following equation is otained;

$$(1/X)+(1/Y)=1/f$$

where X is the distance between the hologram and the reproduction wave source, Y is the imaging distance defined by any single location on the hologram, f is the focal distance defined by any single location on the hologram. In the above equation, the focal distance f gradually increases in accordance with the increase of the distance from the center of the hologram to each of the respective points thereon. Therefore, the imaging distance Y gradually increases in accordance with the increase of the distance from the center of the hologram to each of the respective points thereon. Contrary to the above, in the present invention, it is considered that the focal distance f does not vary in accordance with the increase of the distance from the center of the hologram to each of the respective points thereon due to the aforementioned offset angle P. Thereby, the imaging distance Y also does not vary in accordance with the aforesaid increase. In other words, in the above equation, if f is almost constant, then Y is also almost constant because X is a fixed value.

Through various kinds of experiments regarding the offset angle P, the applicant made the following discovery. The profiles shown in FIG. 17 can be improved by suitably determining a particular relation between the wave length $\lambda_1$ of the laser beam used for producing a hologram and the wave length $\lambda_2$ of the laser beam used as the reproduction wave. Such improvements of the profiles due to the above discovery will be clarified by referring to FIG. 19. In the graph of FIG. 19, the curves $C_4'$, $p_5'$, $p_{10}'$ and $p_{15}'$ are improvements of the curves $C_4$, $p_5$, $p_{10}$ and $p_{15}$ shown in FIG. 17, respectively. As is apparent from the graph of FIG. 19 in comparison with that of FIG. 17, the area of each profile of the curvatures along which the imaging distance l varies by a small amount is relatively wide with respect to the respective diffraction angles $\beta(x)$ when compared to the corresponding area of each profile of the curvatures shown in the graph of FIG. 17. The curves in the graph of FIG. 17 are plotted by using a conventional wave length ratio, that is, $\lambda_2/\lambda_1=1$. Contrary to the above, the curves in the graph of FIG. 19 are plotted by using a given wave length ratio, wherein $\lambda_2/\lambda_1$ equals not 1 but, for example 1.3. Thus, if the wave length ratio $\lambda_2/\lambda_1$ is selected to be over 1, the profile of the imaging distance can be made constant with respect to a relatively wide range of diffraction angle $\beta(x)$. For example, the laser beam for producing a hologram is an Ar laser, the wave length of which being 4880Å ($\lambda_1=4880$Å). While, the laser beam for producing a reproduction wave is He-Ne laser, the wave length of which is 6328Å ($\lambda_2=6328$A).

In a POS terminal device, it is convenient for an operator to have a light scanning apparatus which can scan a bar-code label which is attached either to the bottoms or to the sides of goods. Therefore, the scanning laser beam is usually directed onto goods in such a direction that it can scan either the sides or the bottoms of goods. FIG. 20 schematically illustrates a sectional and front view of the POS terminal device of the prior art. In FIG. 20, a scanning laser beam source 201 radiates a scanning laser beam 202. The reference numerals 76 and 78 represent, respectively, a part of the POS terminal device and a transparent window. These members 76 and 78 are also shown in FIG. 6. Goods 203 each displaying a bar-code label are manually moved by the operator above and along the transparent window 78 and in a direction indicated by the arrow 200. The bar-code label 11 may be attached to the sides of goods as shown in FIG. 20 or to the bottoms of goods (not shown). In order to scan either the bar-code label attached to the sides of goods or the bar-code label attached to the bottoms of goods, the scanning laser beam 202 is applied onto a mirror 204. The reflected scanning laser beam 202', which is slanting at about 45° with respect to the window 78, is used to illuminate the goods 203.

In FIG. 20, both the hatched zone B and crosshatched zone A represent the area within which the bar-code can be read correctly. In other words, the imaging distance of the scanning laser beam 202 is restricted to the zones A and B. However, although the zone B is a zone in which the bar-code can be effectively read, it is not used for reading the bar-code because the zone B is located under the window 78 and inside the POS terminal device. Accordingly, if the zone B were to be located above the window 78 and outside the POS terminal device, such as the crosshatched zone C shown in FIG. 21, then zone B could be effectively utilized for reading the bar-code.

FIG. 21 schematically illustrates a sectional and front view of the POS terminal device which comprises a light-scanning apparatus according to the present invention. In FIG. 21, a scanning laser beam source 211 comprising the light-scanning apparatus according to the present invention radiates a scanning laser beam 212. A reflected scanning laser beam 212° is obtained by means of the mirror 204. As seen in this Figure, the imaging distance is restricted to the zone C, and the bar-code can correctly be read at any location inside such zone C. A change of the zone from the zones A and B (FIG. 20) to the zone C (FIG. 21) can easily be achieved by properly selecting one of the curves shown in the graph of FIG. 17 or FIG. 19 and determining the optimum offset angle P therefrom. Such change of the zone is achieved by shifting a boundary of the zone, represented by a line 220 (also a line 221) in FIG. 20, at a rotating angle Q (FIG. 20). In order to achieve the change under the conditions of, for example, M=4, $\beta(x)=20°$ and $\lambda_2/\lambda_1=1$ the curves in the graph of FIG. 22 are utilized. FIG. 22 is similar to FIG. 17. In FIG. 22, a straight vertical line 223 is constructed first. The line 223 intersects a predetermined central diffraction angle $\beta(x)$. In this case the $\beta(x)$ is set to be 20°. Secondly, tangent lines 224, 225, 226 and 227 are drawn, respectively, through points where the curves $p_{20}$, $p_{15}$, $p_{10}$ and $p_5$ respectively intersect the vertical line 223. Thirdly, a tangent line having a tangent angle Q' which is proportional to the rotating angle Q is selected. Specifically, the tangent line 226 is selected. The tangent line 226 is a line which is drawn through point where the line 223 intersects with the curve $p_{10}$. As a result, a hologram having the characteristic curve $p_{10}$ which is most suitable for achieving the change of the zones can be produced. The zone C in FIG. 21 can be obtained by using the light-scanning apparatus (211) comprised of the hologram which has the characteristic curve $p_{10}$ and which is produced by the process illustrated in FIG. 7B, wherein the offset angle P is set to be 10°.

As mentioned above, the light-scanning apparatus according to the present invention is useful for providing, for example, a POS system having a high resolving power for reading the bar-code of the bar-code label.

What is claimed is:

1. A light scanning apparatus for scanning an object to be scanned in a given scanning direction, comprising:
   a disk having a plurality of holograms for diffracting scanning beams impinging thereon, said plurality of holograms being of a type constructed by applying both a plane wave laser beam and a spherical wave laser beam onto a photosensitive layer coated on a transparent plate, said plane wave laser beam intersecting said photosensitive layer at a predetermined offset angle;
   laser beam source means for radiating a scanning laser beam, said scanning laser beam acting as a reproduction wave and being radiated sequentially onto said plurality of holograms in a direction normal to the surface of each of said plurality of holograms; and
   motive means for moving said scanning laser beam and said disk relative to each other so as to cause said scanning laser beam diffracted by each of said holograms to scan said object to be scanned in said given scanning direction, said scanning laser beam being formed by a spherical wave laser beam.

2. A light scanning apparatus as set forth in claim 1, wherein the distance between said laser beam source means and said plurality of holograms is longer than the distanc between a laser sorce for radiating said spherical wave laser, for constructing said plurality of holograms, and said plurality of holograms.

3. A light scanning apparatus as set forth in claim 1, wherein said predetermined offset angle is determined in dependence upon a desired central diffraction angle, at which angle said scanning laser beam is diffracted by said plurality of holograms.

4. A light scanning apparatus as set forth in claim 3, wherein said predetermined offset angle increases in accordance with an increase of said central diffraction angle.

5. A light scanning apparatus as set forth in claim 4, wherein the wave length of said scanning laser beam is equal to or longer than the wave length of both said spherical wave laser and said plane wave laser for constructing said plurality of holograms.

6. A light scanning apparatus as set forth in claim 1, wherein the light scanning apparatus scans said object in a zone determined by the imaging distance of said scanning laser beam wherein said zone in which said object is scanned in transformed to another zone by suitably selecting said predetermined offset angle.

7. A light scanning apparatus as set forth in claim 3, wherein the wave length of said scanning laser beam is at least equal to the wave length of both said spherical wave laser and said plane wave laser for constructing said plurality of holograms.

8. A light scanning apparatus for scanning an object to be scanned with maximum resolving power, said apparatus comprising, in combination:
   a disc including a plurality of holograms;
   source means for generating a scanning laser beam acting as a reproduction wave, and for directing said scanning laser beam onto said plurality of holograms in a direction normal to each of said plurality of holograms; and
   motive means for moving said scanning laser beam and said disc relative to each other so as to cause said scanning laser beam to scan across a given path on, and to pass through, said plurality of holograms, said scanning laser beam passing through said plurality of holograms being focused at an imaging distance which varies as said scanning laser beam scans across said given path on said plurality of holograms;
   at least one of said plurality of holograms being constructed by applying a plane wave laser beam to a coated transparent plate at a predetermined offset angle, said predetermined offset angle being selected so as to minimize the variation of said imaging distance as said scanning laser beam scans across said given path on said plurality of holograms.

9. A light scanning apparatus as set forth in claim 8, wherein said scanning laser beam is diffracted by a diffraction angle which varies about a desired central diffraction angle as said scanning laser beam scans across said given path on said plurality of holograms, said predetermined offset angle being selected in dependence upon said desired central diffraction angle.

10. A light scanning apparatus as set forth in claim 9, wherein said predetermined offset angle increases in dependence upon an increase of said desired central diffraction angle.

11. A light scanning apparatus as set forth in claim 10, wherein said plurality of holograms is constructed by a production beam of first wavelength, and wherein said scanning laser beam comprises a reproduction beam of second wavelength, said second wavelength being greater than said first wavelength.

12. A method of constructing holograms for use in a light scanning system of improved resolving power for diffracting scanning beams impinging thereon by a diffraction angle varying about a central diffraction angle by an amount $\Delta\beta$, and for focusing said diffracted scanning beams in an imaging field located at an imaging distance $l$ which varies over a range $\Delta l$ in accordance with the variation of said diffraction angle, said method comprising the steps of:
  (a) providing a photosensitive layer coated on a transparent plate;
  (b) selecting a desired central diffraction angle $\beta$;
  (c) selecting an offset angle P for which the variation $\Delta l$ of said imaging distance in accordance with corresponding said variation $\Delta\beta$ of the diffraction angle is minimized; and
  (d) applying a plane wave laser beam to said coated transparent plate at an angle equal to said offset angle.

13. The method of constructing holograms as set forth in claim 12, comprising the additional step (e) of applying a shperical wave laser beam to said coated transparent plate at an angular orientation $\Delta\theta$ with respect to said plane wave laser beam, where $\Delta\theta$ is not equal to 90°.

14. The method of constructing holograms as set forth in claim 12, wherein said holograms have a focal point $f_H$, said method comprising the additional step of selecting a deflection multiplying factor M, where M equals the imaging distance $l$ divided by $f_H$, and wherein said step (c) comprises graphically plotting $l$ versus $\beta$ for said selected deflection multiplying factor.

15. The method of constructing holograms as set forth in claim 12, wherein said holograms have a focal point $f_H$, said method comprising the additional step of selecting a deflection multiplying factor M, where M equals the imaging distance $l$ divided by $f_H$, and wherein said step (c) comprises graphically plotting said offset angle P versus various possible deflection multiplying factors M, said plotting being repeated for various values of said diffraction angle $\beta$.

16. The method of constructing holograms as set forth in claim 12, comprising the additional steps of:
  (e) determining a first wavelength for a reproduction wave which is to be utilized in said light scanning apparatus being constructed, and
  (f) applying a spherical wave laser beam of second wavelength, less than said first wavelength, to said coated transparent plate, whereby to achieve further reduced variation $\Delta l$ of said imaging distance in dependence upon said variation $\Delta\beta$ of said diffraction angle.

17. A method of constructing holograms used in a scanning light system to be constructed which includes a window through which a scanning beam is to be directed at a given angle such that an imaging distance zone defined along the path of said scanning beam by an imaging distance $l$ has a boundary nearest to the source of said scanning beam, which boundary intersects said window at an angle Q, such that only a portion of said imaging distance zone can be utilized for scanning an object to be scanned, said method comprising steps of:
  (a) providing a photosensitive layer coated on a transparent plate;
  (b) selecting a desired central diffraction angle $\beta$;
  (c) graphically plotting said imaging distance $l$ versus said central diffraction angle $\beta$, and repeating said graph plotting for various values of said offset angle P;
  (d) constructing tangential lines to each of the $l$ versus $\beta$ curves at a value of $\beta$ equal to said selected desired central diffraction angle;
  (e) selecting said tangential line having an angle Q' with respect to the horizontal which angle Q' is proportional to said angle Q';
  whereby to choose the optimum offset angle resulting in the entirety of said imaging distance zone being able to be utilized for scanning said object.

* * * * *

UNITED STATES PATENT AND TRADEMARK OFFICE
CERTIFICATE OF CORRECTION

PATENT NO. : 4,235,504  
DATED : November 25, 1980  
INVENTOR(S) : Ikeda et al.

Page 1 of 3

It is certified that error appears in the above—identified patent and that said Letters Patent is hereby corrected as shown below:

Front page, [57], Abstract:
    line 14, after "applied" change "to" to --onto--;  
    line 17, after "applies" change "onto" to --to--.  
Column 1, line 31, "virture" should be --virtue--.  
Column 2, line 26, "paralled" should be --parallel--;  
         line 30, after "because" delete ",".  
Column 3, line 20, "are8respective" should be --are respective--;  
         line 21, "the8curvature" should be --the curvature--.  
Column 4, line 40, after "and" insert --since--.  
Column 5, line 24, after "of" insert --the--;  
         line 51, after "91" insert --is--.  
Column 6, line 28, after "accordance" insert --with--;  
In the following places, "1" should be --$\ell$--:  
        column 6, line 50;  
        column 8, lines 63, 66, 67;  
        column 9, lines 15, 17, 25;  
        column 10, lines 4 (second occurrence), 13, 45, 62;  
        column 11, lines 7, 15, 20, 48, 53;  
        column 12, line 25;  
        column 15, lines 26 and 49; and

UNITED STATES PATENT AND TRADEMARK OFFICE
CERTIFICATE OF CORRECTION

PATENT NO. : 4,235,504  
DATED : November 25, 1980  
INVENTOR(S) : Ikeda et al.

Page 2 of 3

It is certified that error appears in the above—identified patent and that said Letters Patent is hereby corrected as shown below:

```
           column 16, lines 1, 7, 28, 36, and 40.
Column 7, line 50, "refernece" should be --reference--.
Column 8, line 14, after "ordinate" change "x" to --X--;
          line 22, "d_q" should be --d_G--;
          line 46, after "x+Δx," insert --x--.
Column 10, line 4, "1" (first occurrence) should be --Δℓ--;
           line 6, "beam," should be --beams,--;
           line 12, "1'" should be --Δℓ'--;
           line 51, "P_5, P_10, P_15 and P_20" should be --p_5,
             p_10, p_15 and p_20--;
           line 63, "P_15" should be --p_15--;
           line 65, "is" should be --are--.
In the following places, "Δ1'" should be --Δℓ'--:
           column 10, line 62; and
           column 11, lines 14 (both occurrences), 19 (both
           occurrences), 48, and 49.
Column 11, line 49, "P_15" should be --p_15--;
           line 56, "otained" should be --obtained--;
           line 62, after "hologram," insert --and--.
```

UNITED STATES PATENT AND TRADEMARK OFFICE
CERTIFICATE OF CORRECTION

PATENT NO. : 4,235,504

DATED : November 25, 1980

INVENTOR(S) : Ikeda et al.

It is certified that error appears in the above—identified patent and that said Letters Patent is hereby corrected as shown below:

Column 12, lines 31 and 33, "λ2/λ1" should be --$\lambda_2/\lambda_1$--;

line 43, "A" should be --$\overset{\circ}{A}$--.

Column 13, line 33, "λ2/λ1" should be --$\lambda_2/\lambda_1$--;

line 45, after "through" insert --a--; "theline" should be --the line--.

Column 14, line 16, "sorce" should be --source--.

Column 16, line 42, after "angle;" insert --and--.

Signed and Sealed this

Seventh Day of April 1981

[SEAL]

Attest:

RENE D. TEGTMEYER

Attesting Officer     Acting Commissioner of Patents and Trademarks